United States Patent
Baker

[19]

[11] Patent Number: 6,144,509
[45] Date of Patent: Nov. 7, 2000

[54] THREE-COMPONENT LENS RETAINER

[75] Inventor: Allie M. Baker, Cypress, Calif.

[73] Assignee: Recon/Optical, Inc.

[21] Appl. No.: 09/353,299

[22] Filed: Jul. 13, 1999

[51] Int. Cl.[7] .................................................. G02B 7/02
[52] U.S. Cl. ......................... 359/819; 359/830; 359/829
[58] Field of Search .................................. 359/811, 819, 359/829, 830, 808, 825, 828

[56] References Cited

U.S. PATENT DOCUMENTS

| | | | |
|---|---|---|---|
| 3,942,881 | 3/1976 | Meginnis | 359/894 |
| 4,662,717 | 5/1987 | Yamada et al. | 359/362 |
| 4,909,599 | 3/1990 | Hanke et al. | 359/819 |
| 6,040,950 | 3/2000 | Broome | 359/820 |

FOREIGN PATENT DOCUMENTS 362239115  10/1987  Japan ............................... G02B 7/02

OTHER PUBLICATIONS

Applicant acknowledged prior art (fig.2), Dec.12,1999.
Paul Yoder, Jr., Optomechanical Systems Design, 2d Ed., Marcel Dekker, Inc. (1993), pp. 155–177.
Anees Ahmand, Handbook of Optomechanical Engineering, CRC Press (1997), pp. 151–161

*Primary Examiner*—Georgia Epps
*Assistant Examiner*—Saeed Seyrafi
*Attorney, Agent, or Firm*—McDonnell Boehnen Hulbert & Berghoff

[57] ABSTRACT

A method and retainer assembly for securely retaining a lens in a cell or other holding structure so that the lens does not become displaced when the cell is subject to mechanical shock and vibration. The invention is particularly useful for use in retaining large, heavy optical elements, such as can be found in long focal length aerial reconnaissance camera systems. The method involves the step of seating and centering the lens into the cell. The lens has a peripheral surface having a beveled feature. A first rigid, e.g., metallic, ring having a complementary beveled surface is installed over the peripheral beveled surface of the lens. A second rigid, e.g., metallic, ring is installed over the first ring. A retaining ring is threaded onto the cells such that the retaining ring abuts against the second ring. The retaining ring is tightening onto the cell such that the second ring conforms to the retaining ring while maintaining the alignment of the lens in the cell. The retaining Ting is secured to the cell, such as by staking or use of an adhesive.

27 Claims, 4 Drawing Sheets

THREE-COMPONENT LENS RETAINER

BACKGROUND OF THE INVENTION

1. Field of the Invention

This invention relates to the field of optical systems and other precision devices, and more particularly to a method and construction for accurately and securely retaining a lens or other optical element in a cell or other holding structure. The invention is particularly suitable for retention of large, heavy optical elements that are prone to become displaced in the course of shipment or usage, thereby upsetting an initial condition of accurate optical alignment of the optical elements.

2. Description of Related Art

In the art of optical design, accurate alignment of the optical elements (e.g. the objective lens) in an optical system is critical to achieving the desired performance of the system. This is particularly true in the case of high performance optical systems, such as high resolution photographic optical systems employed in the field of aerial reconnaissance. When such systems are designed and manufactured, great care is taken to insure that the lens and other optical elements are installed into the camera housing such that the lens is correctly aligned relative to the lens cell or other structure to which the lens is mounted. Ideally, such aligned condition is maintained during shipment from the manufacturer to the customer, and thereafter during use.

When the lens in question is relatively small or light weight, known lens retaining methods have generally been adequate to keep the lens retained in the surrounding mechanical structures during shipping and subsequent use. However, when the optical elements are of an increased size, or of an increased weight (due to either large size, doping of the glass with heavy elements, or both) and only flat contact surfaces exist, known lens retaining methods have a potential for failure. Mechanical shocks and vibration during shipment and use are more likely to upset the initial condition of accurate alignment of such heavy or large optical elements. Any deviation of the lens alignment from the initial, aligned condition can seriously degrade the performance of the system. For example, if the system is a high-resolution aerial reconnaissance camera system to be flown in a military aircraft, a non-aligned condition of the objective lens can result in substantial loss of resolution of the resulting photographs or electro-optical imagery.

Figure 1:
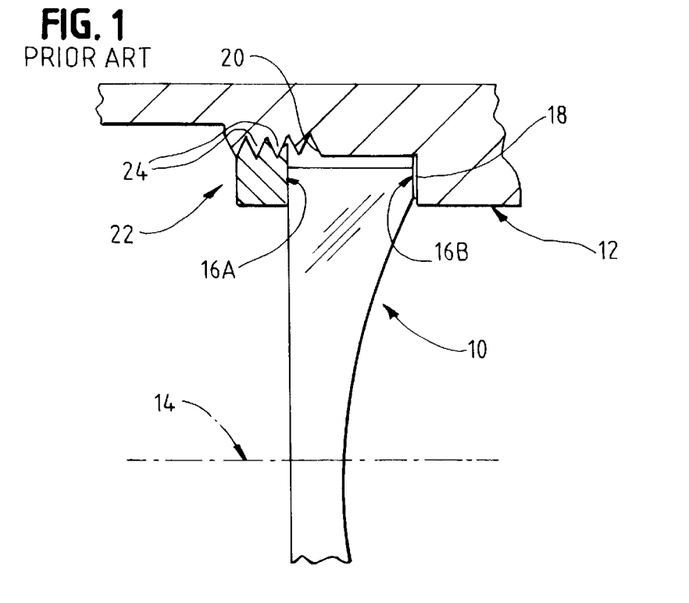
FIG. 1 is a cross sectional view of a prior art lens retaining construction for a flat-flat optical element.

FIG. 1 is a cross-sectional view of a prior art set up for retaining an optical element 10 having flat contact surfaces 16A and 16B in a cell 12; a plano-convex lens element is shown as an example. Such a component may be called a flat-flat element. The cell 12 provides a holding structure for the element 10 in a nominally aligned condition relative to an optical and mechanical axis 14. In the typical situation, the lens element 10 has a flat/flat contact interface at its front and rear contact areas of the element, as indicated as 16A and 16B. Normally, when the optical element 10 is centered in its seat 18 in the lens cell 12, the small space 20 around the periphery of the element 10 is filled with an elastomeric material such as RTV. After curing of the elastomer, the element 10 is retained by a threaded retaining ring 22 which installs onto threads 24 provided in the cell 12, and the retaining ring 22 is secured to the cell 12 by staking or other means. When a sufficient transverse force is applied to the element 10, by say, mechanical shock, the element 10 may overcome the frictional forces between the element 10 and the retaining ring 22 and between the element 10 and the seat 18. Any significant transverse displacement away from the mechanical axis 14, even though small in terms of magnitude, can upset the state of optical symmetry and alignment and degrade the optical performance of the complete lens system. This is particularly so in the case of high-performance lens systems such as are found in aerial reconnaissance camera systems and in optical sights for weapon systems.

Figure 2:
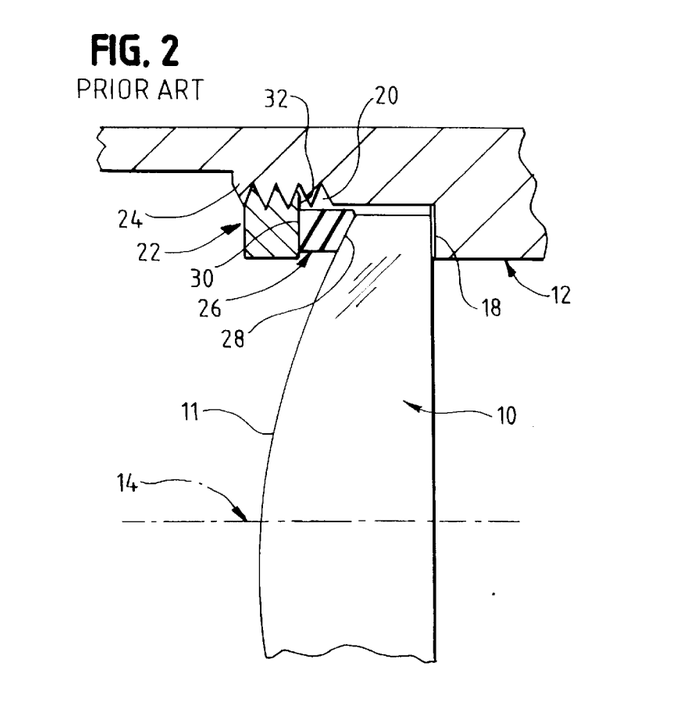
FIG. 2 is a cross-sectional view of a second prior art lens retaining construction for a non-flat-flat optical element.

Another prior art retaining system not used with flat-flat elements, this one having a floating ring, is illustrated in FIG. 2. Like components illustrated in FIGS. 1 and 2 are given the same reference numerals. Referring to FIG. 2, the optical element 10, shown by way of example, has a convex surface 11 and is centered within its seat 18 in the lens cell 12. A floating ring 26 is installed over the outer convex optical surface 28 of the element 10 and a threaded retaining ring 22 is positioned on the floating ring 26. In this situation, after the element 10 has been centered on its seat 18 with respect to the optical axis 14, and the elastomer has been poured and cured around the element in the space between the element 10 and the seat 18, the two-ring system 26 and 22 is installed on the element 10. As the threaded retaining ring 22 is tightened on the floating ring 26, the floating ring adjusts its position by rolling around the spherical optical surface 28 of the element 10 until the outer surface 30 of the floating ring 26 becomes parallel to the inner or rear surface 32 of the threaded retaining ring 22. This action will not upset the alignment of the element, and will provide positive restraining forces on the element 10.

The method of FIG. 2, however, cannot be used for elements with a flat-flat configuration (such as shown in FIG. 1). The reason is that the floating ring 26 would not be able to find a position in which it intimately contacts both the flat surface 16A (FIG. 1) of the element 10 and the flat surface 32 of the threaded retaining ring 22 due to the effective radius of the flat surface of surface 16A being infinite.

The present invention addresses the problem of how to retain a flat-flat optical element, particularly one that is relatively large and/or heavy, within its associated cell such that the condition of accurate optical alignment is maintained during shipment and subsequent use. As such, the present invention presents a substantial improvement over the constructions shown in FIGS. 1 and 2.

SUMMARY OF THE INVENTION

A retaining assembly is provided for securing an optical element such as a lens to a cell that holds the optical element in a secure and accurate position. The optical element is formed or machined in a manner such that the front peripheral edge of the lens element has a beveled surface, such as a portion of a right circular cone.

The retaining assembly includes a rigid, e.g., metallic, element contact ring that is placed over the optical element after the optical element has been seated into the cell in an aligned condition. The element contact ring has a first or rear surface and a second or front surface. The rear surface has a conical surface segment and is positioned onto the optical element such that the conical surface segment of the ring is placed in a complementary manner over the beveled peripheral surface of the optical element. In a preferred embodiment the conical surface of the lens element matches the conical surface segment of the element contact ring. The second or front surface of the element contact ring has a spherical contour with the radius having a center on the mechanical axis of the entire lens assembly.

The retaining assembly further includes a second or intermediate ring that is installed over the element contact ring. The intermediate ring has a first or rear surface and a second or front surface, wherein the rear surface of the intermediate ring abuts the front surface of the element contact ring. The inner surface of the intermediate ring is machined into either a spherical surface segment identical in radius to the front surface of the element contact ring or, usually more conveniently, a conical surface segment with a cone angle which will allow contact with the element contact ring near the middle of the element contact ring width.

The retaining assembly further includes a third or threaded retaining ring that is placed over the intermediate second ring. The retaining ring engages the cell, such as by threading, in a manner such that it snugly secures the element contact and intermediate rings between the optical element and the retaining ring, with the optical element and the three rings retained together against the cell in a secure assembly.

As noted above, the front surface of the element contact ring is machined or otherwise formed into a spherical surface segment with a center of curvature lying on the optical axis. The radius of curvature of the spherical surface is not critical within wide limits. The contact of the intermediate ring with the element contact ring occurs roughly near the center or middle of the spherical surface segment of the element contact ring. This construction promotes the ability of the intermediate ring to roll around the element contact ring when the retaining ring is threaded onto the cell to secure the assembly together. More specifically, when the retaining ring is installed and tightened onto the cell, the intermediate ring can float or roll around the element contact ring and assume a conformal angular attitude to allow a matching to the element contact ring; this process will permit tightening of the ring set without disturbing the position of the centered optical element. When the retaining ring has been threaded on to the cell, the torque applied to the retaining ring also operates to securely retain the rings and the optical element to the cell. Thus, when the retaining ring is installed and secured to the cell (such as by staking), the entire assembly is in a secure condition and the proper alignment of the optical element with respect to the cell is maintained.

In one possible embodiment, an epoxy or other adhesive agent is also applied to secure the threaded retaining ring. Additionally, an adhesive agent is preferably applied between each of the first, second and retaining rings to insure that no significant inadvertent movement occurs between any two adjacent components. This may be particularly desirable for especially large and heavy elements. The epoxy may be applied at the inner edges of the rings or through the use of small cut-outs at the inner edges of the rings radially just outside of the glass element.

BRIEF DESCRIPTION OF THE DRAWINGS

Presently preferred and alternative embodiments of the invention will be discussed below in conjunction with the appended drawing figures, wherein like reference numerals refer to like elements in the various views, and wherein.

DETAILED DESCRIPTION

Figure 3:
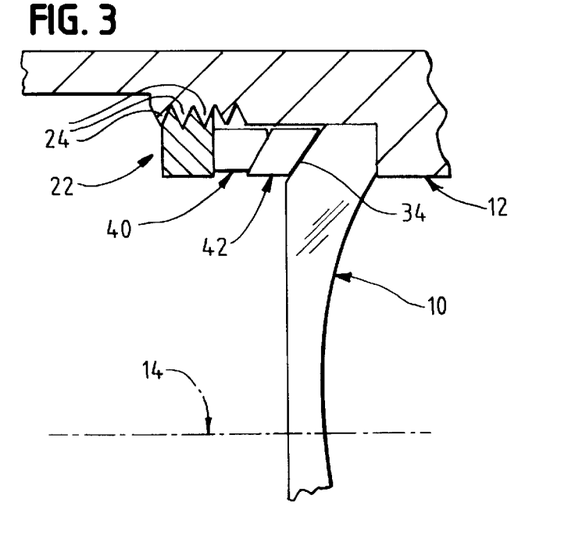
FIG. 3 is a cross-sectional view of a three-component lens retaining construction in accordance with an embodiment of the invention.

Referring now to FIG. 3, a cross-sectional view of a three-component lens retaining construction in accordance with one possible embodiment of the invention is illustrated. The retaining assembly secures an optical element 10 such as an objective lens for an aerial reconnaissance camera system, to a cell 12 proving a holding structure for the optical element 10. The particular details of the optical element, cell and optical system in general are not particularly important. The cell defines an opto-mechanical axis 14 with which the optical element is aligned.

The peripheral portion of the optical element 10 is machined or ground to form a beveled or conical peripheral surface 34. In a preferred embodiment, the surface 34 consists of a portion of a right circular cone with a conical axis coincident with the optical axis of the lens element.

The inventive three-component lens retaining assembly comprises an inner or element contact ring 42, an intermediate ring 40, and a threaded retaining ring 22. The threaded retaining ring 22 threads onto complementary threads 24 provided in the cell 12, in the manner illustrated. The element contact ring 42 and the intermediate ring 40 are preferably formed of a rigid material capable of being machined, such as aluminum, steel or other metal. The surfaces of the element contact ring 42 and intermediate ring 40 are given special contours, as described below in detail. These surfaces are shown somewhat better in FIG. 4. The individual rings are shown in cross-section in FIGS. 5–7 and will be described in further detail subsequently.

Figure 4:
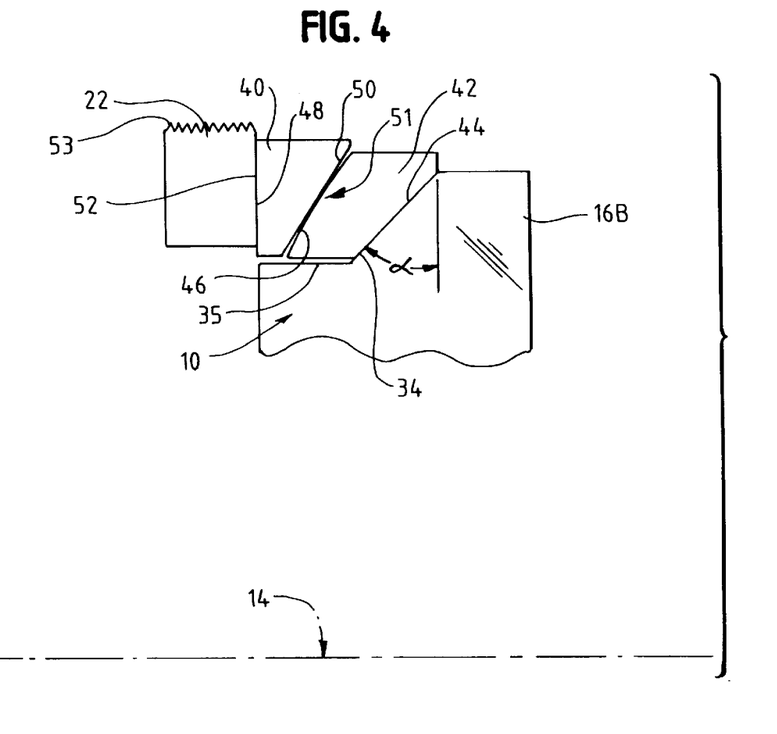
FIG. 4 is a detailed cross-sectional view of a three-component lens retaining construction in accordance with another embodiment of the invention, shown somewhat enlarged and in isolation from the lens cell in order to better illustrate the features thereof.

The embodiment of FIG. 4 differs from FIG. 3 in that the peripheral portion of the optical element 10 is given a slightly different form. In both FIGS. 3 and 4, the optical element 10 has a peripheral beveled feature 34 formed as a portion of a right circular cone of angle α with a conical axis coincident with the optical axis of the lens element. In FIG. 4, the optical element may have a shelf portion 35 that provides a space for two of the rings 40 and 42.

Figure 5:
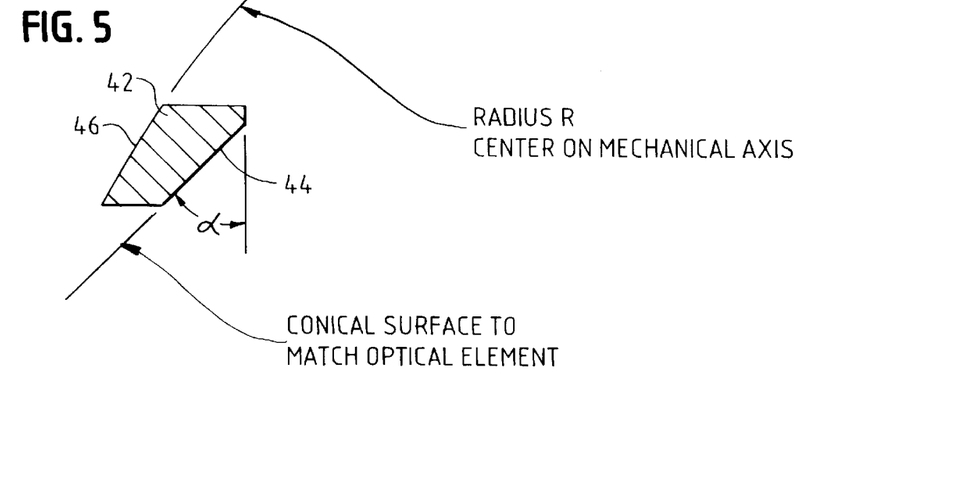
FIG. 5 is a cross-sectional view of the element contact ring of FIGS. 3 and 4.

Referring now to FIGS. 4 and 5, the element contact ring 42 has first or rear surface 44 and a second or front surface 46 machined into the ring material. In a preferred embodiment, the rear surface 44 is a conical surface segment that substantially matches that of the surface 34 of the lens element 10, that is, has the same cone angle α. The conical surface segment 44 is placed adjacent to the conical peripheral surface 34 as shown in FIG. 4 when the assembly is performed. The ring 42 can only contact the optical element 10 in "one" way (semi-kinematically), and, therefore, the element and the contact ring pair can be seen to constitute one unit with positional integrity. In practice, very small differences between the cone angle of the ring 42 and that of the element 10 will be absorbed by a small elastic bending of the contact ring 42. If surface 44 has a convex spherical shape, it could fit onto the conical surface of the element 10 and will indeed fit only one way. It will introduce higher local stress at the line contact but could, in some cases, be a viable shape. However, the primary goal with the shape of surface 44 is to provide an intimate contact condition with the beveled surface 34 of the optical element and the conical surface segment 44 with a matching cone angle α shown in FIG. 5 is the preferred embodiment.

The front surface 46 is machined as a spherical surface segment having its center on the opto-mechanical axis 14 of FIG. 3. The exact value of the radius of the sphere is not critical within wide limits, and indeed is largely unimportant, but will be chosen for optimal mechanical advantage and convenience; a shorter radius provides greater resistance to residual transverse motions.

Figure 6:
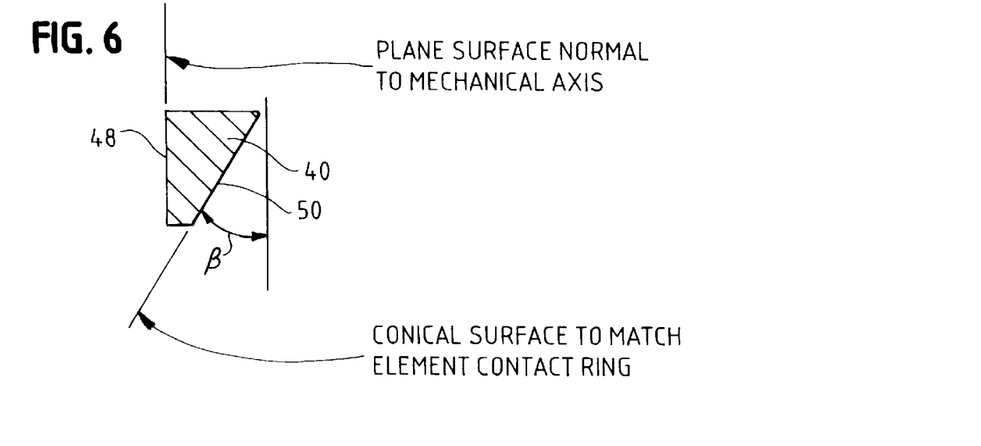
FIG. 6 is a cross-sectional view of the intermediate ring of FIGS. 3 and 4.

Referring now to FIGS. 4 and 6, then an intermediate ring 40 is positioned upon the element contact ring 42. The intermediate ring 40 has a rear surface 50 and a front surface 48. The ring 40 is also preferably made from a rigid material capable of being machined, such as steel or aluminum. Other substantially rigid materials, e.g., composites, could be used. The rear surface 50 is machined into either a spherical surface segment having a radius that is nominally the same as, or identical to, the front surface 46 of the element contact ring 42. Alternatively, and usually more conveniently, the rear surface 50 has a conical surface segment. The cone angle β is selected which will allow line contact between the middle of the ring 40 and the element contact ring 42 near the middle of the element contact ring width, i.e., as shown in FIG. 4 at 51. The intermediate ring 40 is free to roll on the contact ring 42 and can assume an arbitrary angular attitude. Its final position will be determined when the third ring is installed, as discussed below. The intermediate ring 40 has a front planar surface 48 that is normal to the opto-mechanical axis 14 when the ring is installed on the element contact ring 42.

Figure 7:
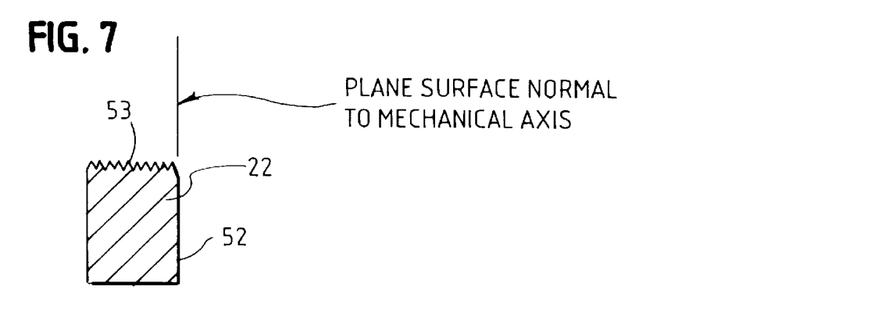
FIG. 7 is a cross-sectional view of the threaded retaining ring of FIGS. 3 and 4.

Finally, and referring to FIGS. 4 and 7, the threaded retaining ring 22 is installed upon the intermediate ring 40. The threaded retaining ring 22 has a rear planar surface 52 that is also normal to the opto-mechanical axis and which abuts the surface 48 of the intermediate ring 40. The threaded retaining ring is also preferably made of a rigid, metallic material. Other materials are also possible.

Referring now primarily to FIG. 4, as the retaining ring 22 is threaded onto the lens cell 12, the intermediate ring 40 will float and assume a conformal angular attitude to allow a matching to the element contact ring 42. This process will permit a tightening of the ring set without disturbing the position of the centered optical element 10.

After the assembly process is complete, the optical element 10 is checked to verify that its alignment has not changed. If a change has occurred, the assembly process must be repeated. Otherwise, the threaded retaining ring 22 is staked to the housing or cell 12 near its threads 53.

Figure 6A:
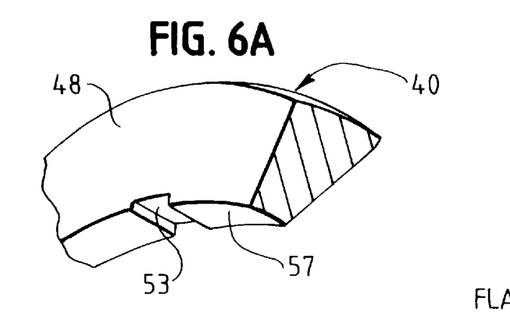
FIG. 6A is an elevational view of a portion of the intermediate ring of FIG. 6.
Figure 10:
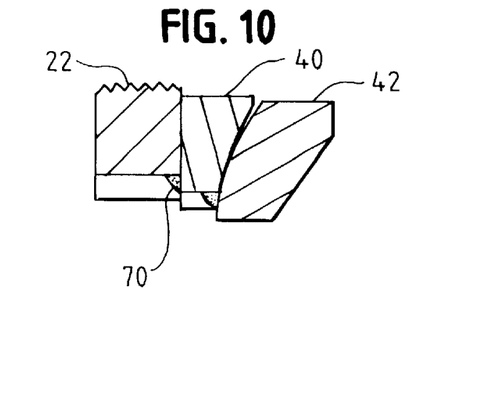
FIG. 10 is an illustration of the use of staking to secure the first, second and third rings together.

It may be desirable, especially for large and heavy elements, to introduce small spots of a soft epoxy or other adhesive to secure the three rings together to prevent slippage during shipment or usage. This may be done by applying the epoxy at the rear edges of the rings 40, 42 and 22, or, through the use of small cutouts at the inner edges of the rings radially just outside the element 10. An example is shown in FIG. 6A, with cutouts 53 machined into the inner edge surface 57 for the purpose of introduction of epoxy to adhere intermediate ring 40 to element contact ring 42. Preferably the epoxy or adhesive is applied between each of the three rings 22, 40 and 42 so that no significant movement occurs between any two of the components. FIG. 10 shows the application of a staking material 70 applied to the first, second and third lenses.

Thus, when the retaining ring 22 is torqued down on the cell and affixed in position (such as by staking) the element contact, intermediate and retaining rings are retained together in a secure assembly with the optical element 10 maintained in an aligned condition relative to the opto-mechanical axis 14.

Figure 8:
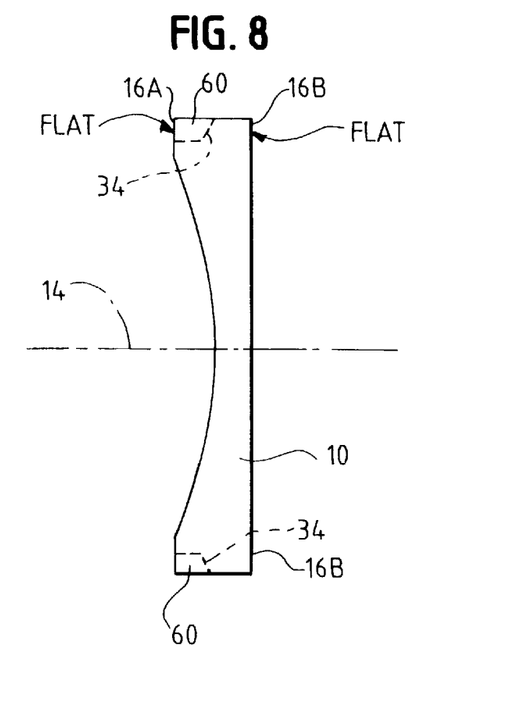
FIG. 8 is an illustration of a plano-concave lens element having flat-flat contact surfaces, showing a portion of the outer contact surface to be removed in order to form the conical or beveled feature in the lens element similar to that shown in FIGS. 3 and 4.

Referring now to FIG. 8, a lens element 10 that has a flat-flat contact interface in regions 16A and 16B will need to be modified somewhat to adapt to the inventive three-component lens retaining system of FIG. 4. This is achieved by either grinding or machining away a peripheral portion of the lens element, shown at 60, to form the beveled or conical surface 34. The surface 34 may be as shown in FIG. 3 or in FIG. 4. For most glass optical elements, a grinding process is sufficient, although it should be performed very accurately and with great care. For metallic components to be centered, the surface 34 may be machined.

Figure 9:
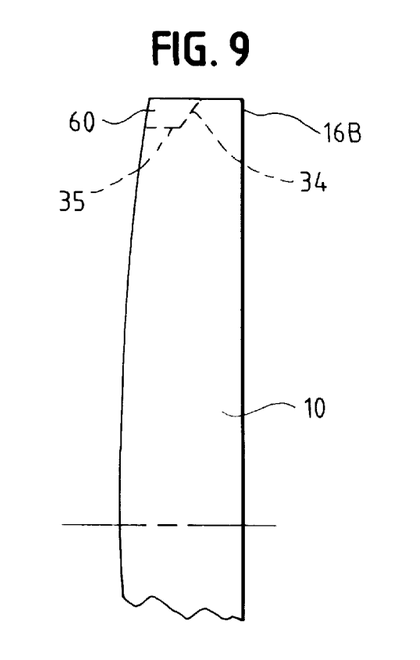
FIG. 9 is an illustration of a small-curvature plano-convex lens element showing a portion of the convex surface to be removed in order to form the conical or beveled feature in the lens element similar to that shown in FIGS. 3 and 4.

Referring to FIG. 9, an optical element with a nominal plano-convex form with long surface radius may also be modified to adapt to the present inventive retaining assembly. The portion 60 of the lens element is ground away to produce the shelf portion 35 and the right circular cone portion 34. The depth of the shelf portion is arbitrary and may be eliminated if desired. Thus, it will be appreciated that the invention can be practiced with a variety of types of optical elements.

From the foregoing description, persons skilled in the art will appreciate that various modifications may be made from the disclosed embodiments without departure from the scope and spirit of the invention. This true scope and spirit will be found by reference to the appended claims, interpreted in light of the foregoing specification.

What is claimed is:

1. A retaining assembly for securing an optical element to a cell proving a holding structure for said optical element, said cell defining an opto-mechanical axis for said optical element, said optical element having a first flat surface abutting said cell and having a conical peripheral surface, comprising:

an element contact ring having first surface and a second surface, wherein said first surface comprises a conical surface segment, said conical surface segment placed adjacent to said conical peripheral surface of said optical element;

an intermediate ring disposed adjacent to said element contact ring, said intermediate ring having a first surface and a second surface, wherein said first surface abuts said second surface of said element contact ring; and a retaining ring disposed adjacent to said intermediate ring, said retaining ring adapted to engage with said cell in a manner to secure said element contact and intermediate rings snugly between said optical element and said retaining ring such that said optical element and said cell and said first, second and retaining rings are retained together in a secure assembly with said optical element in an aligned condition relative to said opto-mechanical axis;

wherein said element contact ring, intermediate ring and retaining ring are disposed and arranged in an axially aligned condition and in an axial direction substantially parallel to said opto-mechanical axis.

2. The assembly of claim 1, wherein said peripheral surface of said optical element comprises a portion of a right circular cone having a cone angle α, and wherein said conical surface segment of said element contact ring is formed with a cone angle substantially equal to said angle α.

3. The assembly of claim 1, wherein said first surface of said intermediate ring comprises a spherical surface segment.

4. The assembly of claim 1, wherein said first surface of said intermediate ring comprises a conical surface.

5. The assembly of claim 4, wherein said second surface of said element contact ring comprises a spherical surface segment having a middle portion thereof, and wherein said conical surface contacts said spherical surface segment of said element contact ring in substantially said middle portion of said spherical surface segment.

6. The assembly of claim 1, wherein said retaining ring threadably engages said cell, and wherein said retaining ring (1) is torqued onto said cell to securely retain said element contact and intermediate rings against said optical element and said optical element to said cell and (2) is thereafter mechanically secured to said cell.

7. The assembly of claim 1, further comprising an adhesive applied between each of said element contact, intermediate and retaining rings.

8. The assembly of claim 1, wherein said element contact and intermediate rings are made from a metallic material.

9. The assembly of claim 1, wherein said second surface of said element contact ring comprises a spherical surface segment having a center lying on said opto-mechanical axis.

10. The assembly of claim 1, wherein said optical element comprises a lens for an aerial reconnaissance camera system.

11. The assembly of claim 1, wherein intermediate ring further comprises a substantially planar front surface segment oriented normal to said opto-mechanical axis and wherein said threaded retaining ring comprises a substantially planar rear surface segment abutting said substantially planar front surface segment of said intermediate ring.

12. A lens assembly for an aerial reconnaissance camera, comprising:

a lens having a first flat cell-contacting surface and a conical surface ground into a peripheral portion of said lens, said lens for directing radiation from a scene onto an photosensitive recording medium;

a cell receiving said flat cell-contacting surface of said lens and defining an opto-mechanical axis for said lens; and a lens retaining assembly for said lens, said lens retaining assembly securing said lens to said cell, wherein said lens retaining assembly comprises:

an element contact ring having a rear surface and a front surface, wherein said rear surface comprises a conical surface segment substantially matching said conical surface ground into said peripheral portion of said lens, said element contact ring installed over said lens such that said conical surface segment is placed adjacent to said conical surface of said lens;

an intermediate ring disposed over said element contact ring, said intermediate ring having a rear surface and a front surface, wherein said rear surface of said intermediate ring abuts said front surface of said element contact ring; and a retaining ring disposed over said intermediate ring, said retaining ring engageable with said cell in a manner to secure said first and second rings snugly between said optical element and said retaining ring such that said optical element and said cell and said first, second and retaining rings are retained together in a secure assembly;

wherein said element contact ring, intermediate ring and retaining ring are disposed and arranged in an axially aligned condition and in an axial direction substantially parallel to said opto-mechanical axis.

13. The assembly of claim 12, wherein said peripheral surface of said lens comprises a portion of a right circular cone having a cone angle a, and wherein said conical surface segment of said element contact ring is formed with a cone angle substantially equal to said angle α.

14. The assembly of claim 12, wherein said rear surface of said intermediate ring comprises a spherical surface segment.

15. The assembly of claim 12, wherein said rear surface of said intermediate ring comprises a conical surface.

16. The assembly of claim 15, wherein said front surface of said element contact ring comprises a spherical surface segment having a middle portion thereof, and wherein said conical surface of said intermediate ring contacts said spherical surface segment of said element contact ring in substantially said middle portion of said spherical surface segment.

17. The assembly of claim 12, wherein said retaining ring threadably engages said cell, and wherein said retaining ring (1) is torqued onto said cell to securely retain said element contact and intermediate rings against said optical element and said optical element to said cell and (2) is thereafter mechanically secured to said cell.

18. The assembly of claim 12, further comprising an adhesive applied between each of said element contact, intermediate and retaining rings.

19. The assembly of claim 12, wherein said element contact and intermediate rings are made from a metallic material.

20. The assembly of claim 12, wherein said front surface of said element contact ring comprises a spherical surface segment having a center lying on said opto-mechanical axis.

21. The assembly of claim 1, wherein intermediate ring further comprises a substantially planar front surface segment oriented normal to said opto-mechanical axis and wherein said threaded retaining ring comprises a substantially planar rear surface segment abutting said substantially planar front surface segment of said intermediate ring.

22. A method of retaining a lens in a lens cell, comprising the steps of:

forming a conical surface around the periphery of said lens, said conical surface comprising a portion of a right circular cone with a center placed on an optical axis for said lens, said conical surface having a cone angle α;

installing said lens having said conical surface into said lens cell;

installing an element contact ring onto said lens, said element contact ring having a rear surface segment comprising a portion of a right circular cone having a cone angle substantially equal to said cone angle α;

installing an intermediate ring onto said element contact ring, said intermediate ring having a front surface and a rear surface;

installing a retaining ring onto said intermediate ring in a manner such that said retaining ring engages said cell; and applying force to said retaining ring so as to tighten said retaining ring onto said cell in a manner causing said intermediate ring to roll relative to said element contact ring and assume a position with respect to said element contact ring and said retaining ring such that said front surface of said intermediate ring conforms to said retaining ring while maintaining alignment of said lens with respect to said optical axis.

23. The method of claim 22, further comprising the step of applying an adhesive to at least one of said first, second or third rings.

24. The method of claim 22, wherein said lens comprises an objective lens for an aerial reconnaissance camera system.

25. The method of claim 22, wherein said rear surface of said intermediate ring comprises a portion of a right circular cone.

26. The method of claim 22, further comprising the steps of machining said element contact ring to form said front and rear surfaces of said element contact ring.

27. The method of claim 22, wherein said element contact ring further comprises a front surface comprising a spherical surface segment having a center on said optical axis.

* * * * *

UNITED STATES PATENT AND TRADEMARK OFFICE
CERTIFICATE OF CORRECTION

PATENT NO. : 6,144,509
DATED : November 7, 2000
INVENTOR(S) : Allie M. Baker

It is certified that error appears in the above-identified patent and that said Letters Patent is hereby corrected as shown below:

Figure 3 of the drawing should be replace with the attached new Figure 3. The change is to show a gap between the upper edge of the optical element 10 and the cell 12, to make the drawing consistent with Figures 1 and 2.

Figure 10 should be replaced with the attached new Figure 10. The change is to make the right face of the ring 40 consistent with Figure 6.

In the Abstract, at the second to last line, delete "Ting" and replace it with --ring--.

Column 1,
Line 49, delete "plano-convex" and replace it with -- plano-concave --.

Column 5,
Line 10 delete "sperical" and replace it with -- annular --.

Column 6,
Line 12-13, delete "to the first second and third lenses" and replace it with -- between the rings --.

Column 7,
Line 53, delete "an" and replace it with -- a --, so that the phrase reads "a photosensitive recording medium".

Column 8,
Line 21, delete "a" and replace it with -- $\alpha$ --.

Signed and Sealed this

Twenty-first Day of August, 2001

Attest:

*Attesting Officer*

NICHOLAS P. GODICI
*Acting Director of the United States Patent and Trademark Office*

FIG. 3

FIG. 10